Figure 4:
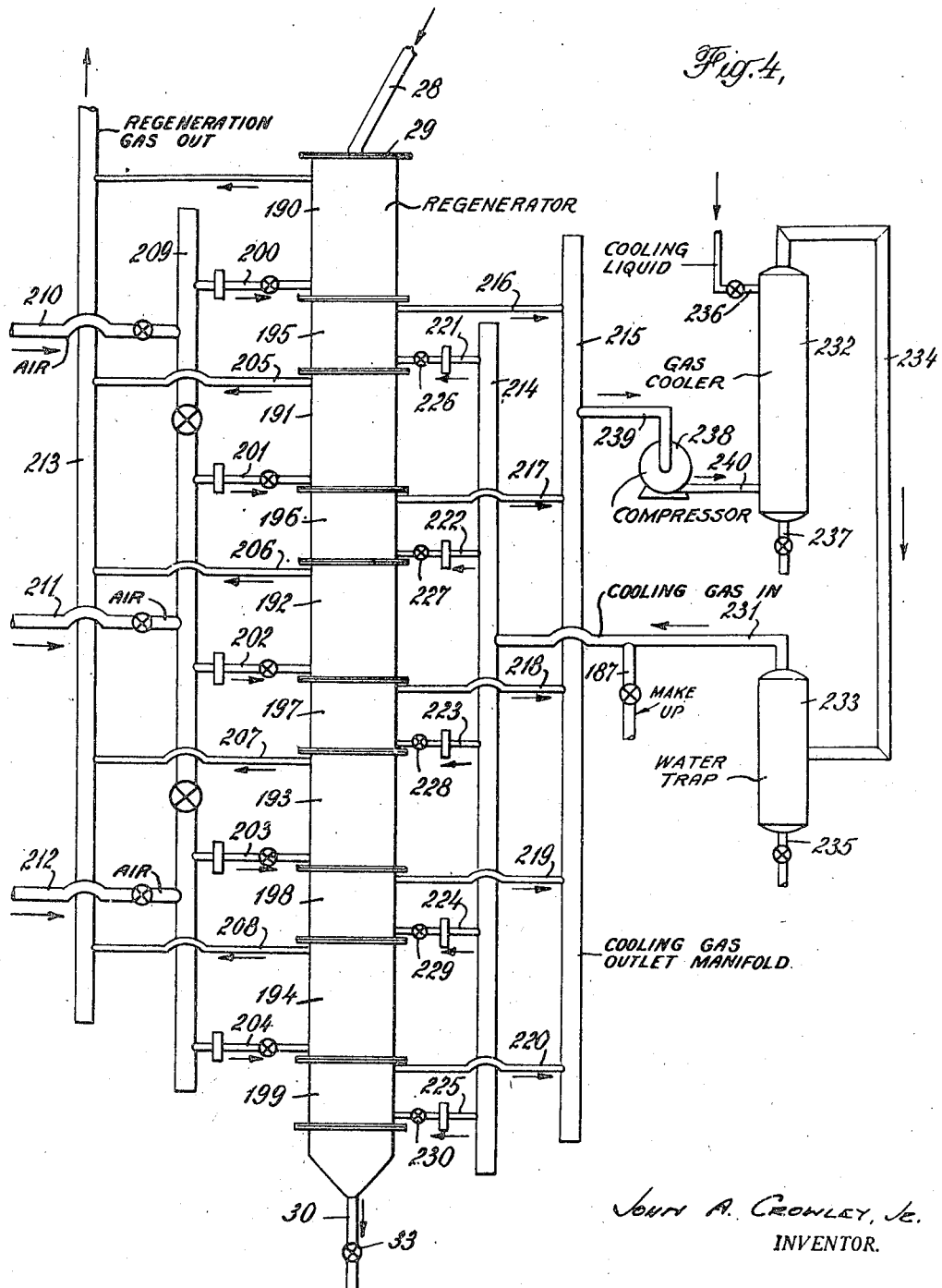

Jan. 4, 1949.    J. A. CROWLEY, JR    2,458,487
METHOD AND APPARATUS FOR CONDUCTING THE
REGENERATION OF A MOVING BED CATALYST
Filed May 24, 1944    5 Sheets-Sheet 1

Fig. 1

JOHN A. CROWLEY, Jr.
INVENTOR.

BY
ATTORNEY.

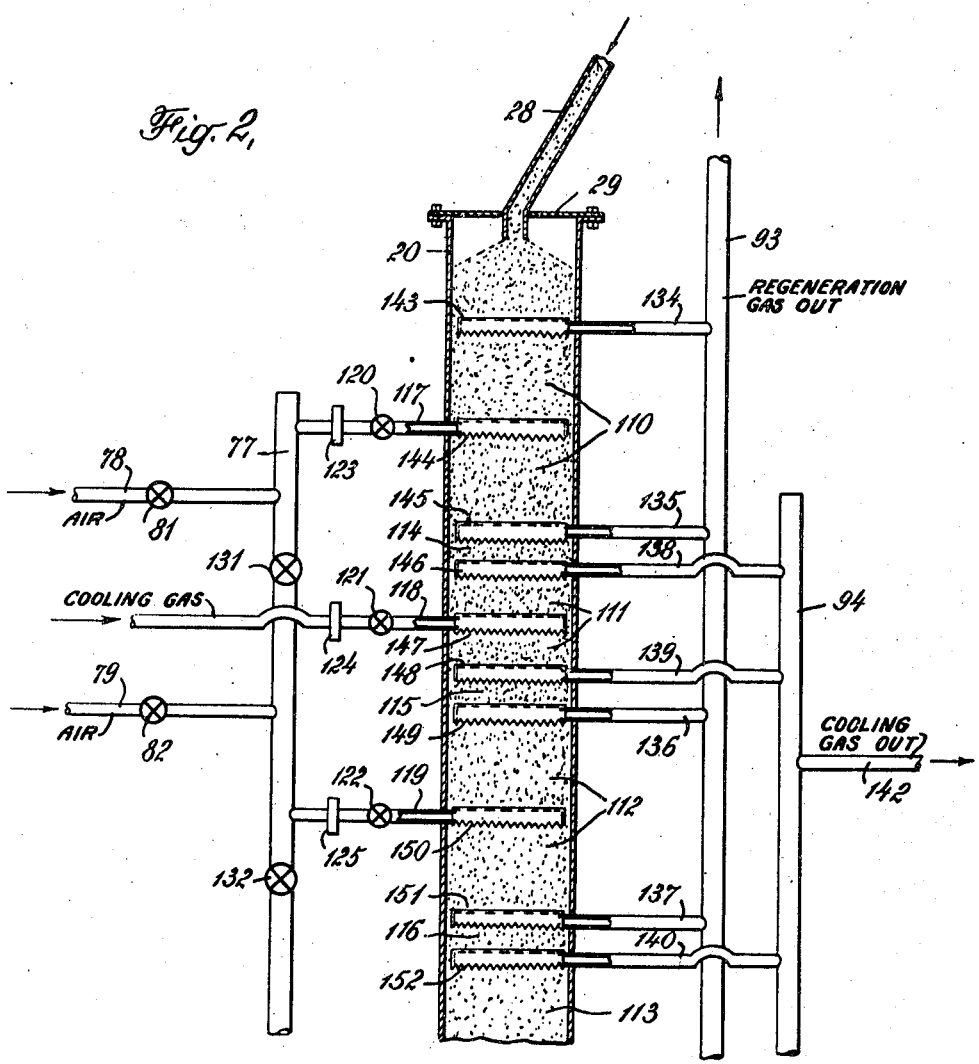

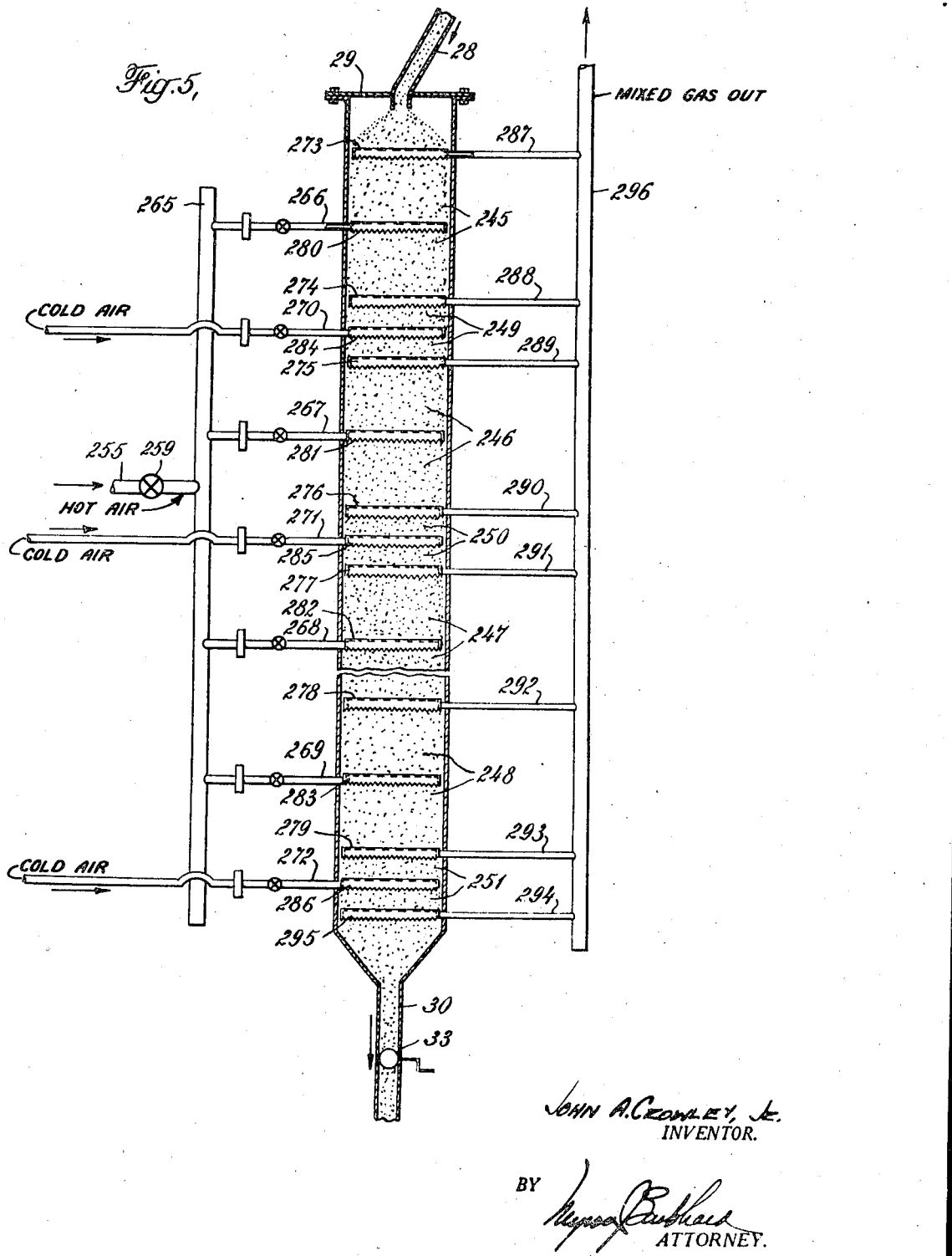

Patented Jan. 4, 1949

2,458,487

UNITED STATES PATENT OFFICE 2,458,487

METHOD AND APPARATUS FOR CONDUCTING THE REGENERATION OF A MOVING BED CATALYST

John A. Crowley, Jr., Scarsdale, N. Y., assignor to Socony-Vacuum Oil Company, Incorporated, a corporation of New York Application May 24, 1944, Serial No. 537,136

8 Claims. (Cl. 252—418)

This invention has to do with a method and apparatus for conducting thermochemical fluid reactions at elevated temperatures in the presence of or with moving beds of particle form solid material which may or may not be catalytic to the desired reaction.

Exemplary of processes of this kind is the regeneration of contact material catalysts which have been used for catalytic cracking of hydrocarbons. It is well known that hydrocarbons of gas oil nature boiling between about 500° F. and about 750° F. may be cracked to gasoline and other products by passing them at reaction conditions of temperature and pressure such as, for example, temperatures of the order of 800° F. and higher at pressures somewhat above atmospheric in contact with a solid adsorptive contact mass. Other processes of like nature are the catalytic cracking hydrogenation, dehydrogenation or polymerization of hydrocarbons of low boiling range, catalytic treating, reforming or desulfurization of gasolines and naphthas, catalytic partial oxidation and similar conversions of hydrocarbon materials.

Ususally in such processes the contact material may partake of the nature of fullers' earth and other natural or treated filtering clays and/or various synthetic associations of alumina, silica or alumina and silica, any of which may or may not have other constituents added such as certain metallic oxides.

In a most recent form the operation of such processes has been developed as one in which the particle form contact material is moved cyclically through two zones in the first of which it is subjected to reaction and in the second of which it is subjected to the action of a fluid regeneration medium, such as a combustion supporting gas acting to burn off contaminant materials deposited upon the contact mass during reaction. In order to permit the use of contact material particles of sizes of the order of 1 to 6 mm. in diameter without undue attrition of said particles and undue abrasion of the apparatus, and for other reasons the above process has been developed as one in which the contact material flow from the regeneration and reaction zones is controlled or throttled at the bottom outlet of said zones, thereby causing the contact material to flow through said zones as substantially continuous masses or columns of particle form solid material.

The present invention has to do specifically with a method of continuous regeneration of contact material which may be applied to a cyclic process such as above described.

In a process such as the above, in which contaminant deposits may, for example, consist of high molecular weight hydrocarbon compounds, are burned from a contact material, considerable quantities of heat may be liberated. It is of great importance that this heat be removed from the contact material and from the regenerator at rates sufficient to prevent the overheating and damaging of the contact material thereby.

It has now been found that the rate of contaminant combustion may vary widely during different stages of contaminant removal. Thus in the burning of a contaminant consisting chiefly of high molecular weight compounds of hydrogen and carbon, the maximum possible burning rate may be very high during the initial stages when the more readily combustible hydrogen is preferentially burned and when the contaminant deposited on the surface and in the larger diameter capillaries of contact material is preferentially removed, and the burning rate may be very low during the later stages of regeneration when less readily combustible carbon and the contaminant deposited in the smaller diameter capillaries of the catalyst is burned. Obviously the rate of heat release will also vary in different stages of the regenerator. Moreover, due to a general decrease in the heat of combustion with decrease in the percentage by weight of hydrogen burned with respect to the carbon constituent of the contaminant, this variation of heat release in the various zones of the regenerator is accentuated.

Heretofore the removal of heat liberated by contaminant combustion from such contact materials has been accomplished by the provision within the regenerator of heat transfer surfaces such as tubes through which an externally controlled heat transfer medium is passed. Such heat transfer tubes are either distributed more or less uniformly throughout the regenerator burning zone or they are concentrated in small stages or cooling zones which are inserted between each of a series of burning zones.

The method and apparatus of the present invention have been found better adapted for many applications especially those in which the rate of heat release due to contaminant combustion varies widely as the contact material passes down through the regenerator. In the present invention, the flowing contact material is passed through a series of alternate burning and cooling stages or zones of proper dimensions, and the contact material is cooled in said cooling stage by the flow therethrough of the required quantity of a cooling gas. Thus the relatively complicated and expensive apparatus heretofore occasioned by the use of heat transfer tubes has been substantially simplified and cheapened. Moreover, for many operations substantially improved flexibility of contact material temperature control is obtained.

A major object of this invention is the provision of a method and apparatus for the conducting of thermochemical fluid reactions in the presence of or with a flowing mass of particle form solid material, while controlling the temperature of said solid material at desired levels without the use of added heat transfer surfaces or tubes within the reaction zone.

A further object of this invention is the provision of a flexible and economical means for controlling the temperature of a flowing contact material between desired limits while burning therefrom a contaminant deposit which may burn with gradually varying rates of heat release.

These and other objects of this invention will become apparent from the following discussion of the invention.

In order to permit a better understanding of the method and apparatus of this invention reference should now be made to the drawings attached hereto. Of these drawings, Figure 1 is an elevational view, partially in section, of one form of apparatus suitable for the process of this invention; Figures 2 and 3 are elevational views, partially in section, of the upper portions of modified forms of this apparatus, and Figure 4 is a rough diagrammatic sketch showing the use of an external cooling gas conditioning and recirculation system in conjunction with such a regenerator. Figure 5 is an elevational view, partially in section, showing still another modified form of the apparatus of this invention. All of these drawings are highly diagrammatic in character.

Turning now to Figure 1, we find an elevational view, partially in section, of a regenerator consisting of a series of superimposed alternate burning stages 20 through 23 inclusive and cooling stages 24 through 27 inclusive, the uppermost stage being closed by a top 29 through which is connected the contact material inlet pipe 28 and the lowermost stage being followed by a tapered drain section 31 and drain pipe 30 to which is attached flow control valve 33. Each of these stages is separated from adjacent stages by plates 44 which extend horizontally thereacross between the connecting flanges 34. Uniformly distributed pipes 45 open on either end connect through and depend from the plates 44 and terminate within the upper end of the stage immediately therebelow thereby providing contact material passages between stages and also a gas collecting space such as 317 above the column of contact material in each stage.

Adjacent the lower end of each burning and cooling stage is a horizontal row of inverted gas inlet channels which extend substantially across the stages in one direction and are spaced uniformly apart in the other direction. One channel in each row may be seen, 35 through 38 inclusive in each of the burning stages 20 through 23 inclusive respectively and channels 39 through 42 inclusive in each of the cooling stages 24 through 27 inclusive respectively. The channels 35 through 38 inclusive in the burning stages are placed in communication with the main gas inlet manifold duct 77 through pipes 46 through 49 inclusive respectively having flow control valves 54 through 57 inclusive and flow indicators 60 through 63 inclusive therein respectively. The inlet manifold duct is sectionalized by means of valves 87 and 88 therein and is supplied with gas through pipes 78 through 80 inclusive having valves 81 through 83 inclusive respectively therein. Gas outlet pipes 89 through 92 inclusive connect through the stage shells into gas collector spaces 310, 311, 313 and 315 respectively in the upper end of the burning stages 20 through 23 inclusive. These pipes 89 through 92 connect into the main combustion gas outlet duct 93.

The channels 39 through 42 in cooling stages 24 through 27 respectively are similarly placed in communication with cooling gas manifold duct 68 through rows of pipes 50 through 53 respectively, having valves 318 through 321 and indicators 64 through 67 respectively therein. The manifold duct 68 is sectionalized by valves 84, 85 and 86 therein and is supplied with gas through pipes 69, 70, 71 and 72 connected thereto and having valves 73, 74, 75 and 76 respectively thereon. Pipes 95 through 98 connect into the upper ends of the cooling zones 24 through 27 respectively and in turn connect into the cooling gas outlet manifold duct 94. It will be understood that the gas inlet and outlet manifolding, as shown, has been somewhat simplified over what it would be in actual installations for the purpose of avoiding confusion in the description of the invention.

In operation, contact material bearing a contaminant deposited during a previous utilization of the contact material, for example, during the catalytic conversion of hydrocarbons in the presence of said contact material is supplied through pipe 28 to the uppermost burning zone 20 at a temperature sufficient for initiating the contaminant combustion. The contact material is heated in its passage through said stage by the heat liberated by contaminant combustion therein, the amount of contaminant combustion being controlled so as to cause said contact material to be heated substantially to a set maximum outlet temperature which is below that which will cause heat damage to the particular contact material being regenerated. The contact material then passes through the cooling stage 24 wherein it is cooled by direct contact with a substantially inert low temperature gas passing upwardly therethrough. In this cooling stage the contact material is cooled from its inlet temperature thereto to a predetermined minimum temperature from said stage which is not below that minimum required to support reasonably rapid (i. e., practical) burning rates in the subsequent burning stage 21. The contact material is similarly alternately heated and cooled substantially between set predetermined temperature limits in the remaining alternate burning and cooling stages and is finally withdrawn through the drain pipe 30. The rate of contact material withdrawal is controlled by valve 33 so as to permit the proper removal of contaminant from the contact material in the regenerator and so as to cause it to flow therein as a substantially compact column of particle form contact material. By proper control of the length and cross-section of the conduct material passage pipes 45 between adjacent stages, sufficient resistance to gas flow through the contact material filling said pipes is provided to prevent substantial gas flow between adjacent stages. Consequently, each burning and cooling stage may be operated in parallel and independently as regards to gas flow therethrough.

Combustion supporting gas such as air, at a temperature generally below that of the contact material in the regenerator (but not necessarily therebelow) is supplied from a compressor (not shown) through pipe 79 to distributing inlet manifold duct 77 from which it passes at the desired rate into each burning stage. If it is desired to charge combustion supporting gas at varying temperatures to the different burning stages, this may be accomplished by charging the gas to the manifold 77 through pipes 78, 79 and 80 and by closing valves 87 and 88 in the duct 77. The gas flow in each combustion stage is upwards through the contact material therein, and the effluent gas is withdrawn from the substantially solid free gas collecting space in the upper end of each stage through the individual outlet pipes 89 through 92 inclusive into the outlet duct 93. The rate of flow of combustion supporting gas to each stage is maintained sufficient to support the predetermined amount of contaminant combustion therein.

A substantially inert cooling gas which has been temperature conditioned in a suitable external apparatus (not shown) may be charged by a compressor (not shown) through pipes 69, 70, 71 and 72 into the inlet manifold 68 and thence to each of the individual cooling stages 24 through 27 through the inlet pipes 50 through 53 respectively at the required rates and temperatures. The gas flow through the cooling stage is similar to that in the burning stages and the heated gas finally leaves the stages through the outlet pipes 95 through 98 and manifold duct 94. The rate and temperature of gas to each cooling stage should be adjusted so as to permit the required amount of heat removal from the contact material passing through each cooling stage as increased sensible heat in the cooling gas.

In Figure 1 the burning stages are shown to be of varied length and volume. It has been found that greater total burning capacity may be obtained from the regenerator when the amount of combustion supporting gas passed through each stage is such as to provide at least a slight excess of the combustion supporting constituent remaining in the effluent gas. When such gas rates are used, it becomes necessary to properly dimension each burning stage so as to provide substantially that volume required for the accomplishment therein of an amount of contaminant combustion which will heat the contact material passing therethrough at a fixed rate of flow approximately to the predetermined maximum outlet temperature. Thus in operations where the rate of heat release due to contaminant combustion may vary in different stages of the regenerator and where the allowable spread between contact material inlet and outlet temperature in a given burning stage may also be varied from stage to stage, it will be apparent that a variation in burning stage size may be required, the stage volumes being varied as the particular application requires. On the other hand in many applications it may be desirable to use burning stages of substantially equal volume throughout the regenerator and to control the amount of burning in each stage by rigid control of the rate and temperature of combustion supporting gas charged thereto. Both methods are useful within the scope of this invention. The volume of each cooling stage should be at least that required to permit accomplishment of the required amount of solid to gas heat transfer therein under the smallest anticipated solid to gas temperature differential. It will be apparent that once this condition is met, the use of inert gas in the substantially independent cooling stages permits a great amount of flexibility as regards to the temperature and rate of introduction of such inert gas to said cooling stages.

Although all the burning and cooling stages shown in Figure 1 are of substantially the same cross-sectional area, it is possible to vary not only the area but the cross-sectional shape of the stages provided the area is sufficient to permit the required gas flow through the contact material column therein without substantial disruption of said column or boiling of the contact material particles. These limits will be further discussed hereinafter.

Other means than those shown in Figure 1 may be used for isolation of each stage as regards to gas flow; such another means is shown in Figure 2. In this figure is shown an elevational view, partially in section, of the upper part of a regenerator in which 110 and 112 are burning stages and 111 is a cooling stage and 113 is the upper end of another cooling stage. These stages are defined by the proper spacing of rows of gas inlet and outlet channels. Thus channels 143 and 145 are gas outlet channels adjacent the two opposite ends of stage 110 and channel 144 spaced approximately midway therebetween is a gas inlet channel. Likewise channels 149 and 151 are outlet channels and 150 is an inlet channel in burning stage 112. Also channels 146 and 148 are gas outlet channels adjacent the opposite ends of the cooling stage 111, and channel 147 is an inlet channel midway therebetween. It will be noted that the spacing of the channels 145 and 146 and of the channels 148 and 149 are such as to provide substantially compact columns of contact material 114 and 115 respectively therebetween which columns are of sufficient length to substantially prevent gas flow between stages. It will be noted that since the channels at the opposite ends of these columns are gas outlet channels, proper design of the gas outlet duct system will provide for substantially equal static gas pressures under said channels with little tendency for gas flow therebetween through the columns 114 and 115.

Combustion supporting gas may be charged through pipes 78 and 79, duct 77 and pipes 117 and 119 having valves 120 and 122 therein into the burning stages 110 and 112 respectively. The gas flow within said stages is both upward and downward from the inlet channels to the outlet channels thereabove and therebelow. The gas then passes from the outlet channels through outlet pipes 134 and 135 and 136 and 137 from stages 110 and 112 respectively into outlet duct 93. Cooling gas passes through inlet pipe 118 and control valve 121 therein into the cooling stage 111 and passes from said stage through outlet pipes 138 and 139 into ducts 94 and 142.

It has generally been found desirable to position the gas inlet channels to each stage approximately midway between the outlet channels therefrom but other spacing for certain operations is within the scope of this invention.

In operations involving very small contact material particle sizes and relatively high gas throughput rates, it may be desirable to provide a plurality of gas distributor and collector means within each stage to permit the required total gas throughput without boiling the contact material. Such a modification is shown in Figure 3 wherein are shown burning stages 155 and 157 with cooling stage 156 therebetween at the upper end of a regenerator. The gas flow may be seen by reference to the combustion stage 155 into which combustion supporting gas from ducts 172 and 171 pass through a row of pipes such as 159. Riser pipes such as 175, closed at their upper ends, connect into pipes 159 and distribute gas through orifices 178 under horizontally extending angle shaped hoods 176 connected thereto at intervals along the lengths of said pipes. The gas passes upwardly and downwardly from the distributing angles 176 to similarly constructed collecting angles 186 attached to pipes 174 which in turn connect into outlet pipes 158. The gas passes into the pipes 174 through orifices 177 therein under the collecting angles and then passes out from the burning stage through pipe 158 to the outlet duct 170. The gas flow is similar in the cooling stage, the gas entering through pipes 165 and risers 183 and distributing angles 180 and the gas leaving through collecting angles 179, and pipes 184 and 164.

The substantial independence of the cooling stages as regards to gas flow in each of the above modifications permits the recirculation of the same cooling gas if desired. Such an arrangement is shown in Figure 4 in which is shown a regenerator comprised of burning stages 190 through 194 and cooling stages 195 through 199 alternately superimposed. The combustion supporting gas passes through pipes 210, 211 and 212 and duct 209 through the individual inlet pipes to the various burning stages and the gaseous products leave each burning stage through individual outlet pipes and pass into outlet duct 213. The cooling gas enters through pipe 231, duct 214 and pipes 221 through 225 into the cooling stages 195 through 199 respectively. The heated gases leave these stages through outlet pipes 216 through 220 respectively and pass into duct 215 and pipe 239, to compressor 238 from which it passes through pipe 240 into the lower end of a cooling tower 232. The gas passes upwardly through said tower and is cooled by water charged thereto through pipe 236 and discharged through pipe 237. The gas passes from tower 234 into water trap 233 where entrained water is separated and the cooled gas then passes through pipe 231 back to the contact material cooling stages. The rate of flow of gas to each cooling stage is controlled by means of valves 226 through 230 in the inlet pipes 221 through 225 respectively.

The above modifications of this invention have involved the use of substantially independent burning and cooling stages in which an active gas is used in the burning stages and a relatively inert gas such as flue gas is used in the cooling stages. However, in some operations it is convenient to employ the same gas in all the stages. For example, a relatively low rate of preheated air flow might be maintained through the combustion stages and a relatively high rate of low temperature air flow might be maintained through the cooling stages. For such applications suitable regenerator construction may be obtained by providing individual gas inlet means to all burning and cooling stages and by causing adjacent stages to share common gas outlet means.

Such a modified apparatus is shown in Figure 5 wherein the individual gas inlet pipes 266 through 269 and gas distributing channels 280 through 283 respectively are provided for burning stages 245 through 248 respectively, and individual gas inlet pipes 270 through 272 and gas distributing channels 284 through 286 are provided in cooling stages 249 through 251 respectively. Pipes 287 through 294 and gas collecting channels 273 through 279 and 295 are outlet means from these stages, adjacent burning and cooling stages sharing common outlet means adjacent their ends. It will be seen that the gas flow within the burning and cooling stages is both upward and downward from the inlet channels to the outlet channels thereabove and therebelow. Combustion supporting gas such as air at desired temperatures may be passed from a compressor (not shown) through pipe 255 and duct 265 into the individual burning stages at the required rates. The effluent gas from all the burning stages leaves the system through outlet duct 296. Cold or partially preheated air may be introduced to the cooling stages 249, 250 and 251, through the inlet pipes 270, 271 and 272 respectively. Heated air may pass from these stages through the outlet channels shared in common with the burning stages into outlet duct 296.

In all the above modifications of this invention the same general principles are involved. A particle form solid material is passed as a substantially compact column through a series of alternate reaction and heat exchange zones. In the reaction zones a thermochemical reaction is conducted which results in heating or cooling the solid passing therethrough from predetermined inlet temperatures to predetermined outlet temperatures. The inlet and outlet temperatures are maintained within the limits of a minimum temperature which will support the reaction at practicably rapid rates and a maximum temperature which will cause heat damage to the solid material. In the heat exchange zones the temperature of the solid passing therethrough is changed in a direction opposite to that in the reaction stage and generally within the same broad limits by direct contact with a gaseous agent passed therethrough. For the purpose of convenience the foregoing and the following discussion of this invention are chiefly in terms of exothermic reaction between contaminant bearing contact materials and gaseous reactants, but it should be understood that such application is intended as merely exemplary in nature.

In view of the wide variation of the applications to which this invention may be applied it should be apparent that no set or fixed operation or construction limitations may be set forth. Certain broad limitations and specifications may be discussed, however, and from these, and from the general principles of this invention herein set forth and from pertinent data for any given application to which the invention is to be applied, proper operation conditions and apparatus construction may be calculated by methods known to those skilled in the art.

As has been shown hereinbefore, when a contaminant bearing catalyst is to be regenerated in a regenerator operating near capacity as regards to amount of contaminant burned per unit of regenerator volume, the rate of combustion supporting gas flow through the burning stages should be such as will provide at least some excess of reactant constituent in the effluent gas from said burning stages. Under such operating conditions the volume of the burning stages should be substantially that required to permit accomplishment therein of an amount of reaction sufficient to change the catalyst temperature between certain inlet and outlet limits set for said stage. The stage volume required will obviously depend upon a number of variables inherent in the particular application involved such as: total amount of catalyst to be regenerated per unit of time, the rate of combustion and heat release thereby for the particular stage and operating conditions involved, the maximum allowable temperature to which the catalyst may be heated without damage to its activity, the minimum temperature at which the contaminant may be rapidly burned and the specific heat of the particular catalyst. These variables may be determined for any particular operation by methods well known to the art, and once determined, the required burning zone volume may be easily set. If the regenerator is to be operated below maximum capacity, the burning stages may be of greater volume than that required to permit the desired amount of combustion at capacity operation, and the amount of reaction accomplished may then be controlled by regulation of the rate of combustion supporting gas flow through the burning stages.

The volume of the cooling stages of the regenerator should be such as to permit accomplishment therein of the desired amount of gas-solid heat transfer at the anticipated solid to gas temperature differential. Should the cooling stages be of greater volume than that required, no particular harm results as long as an inert cooling gas is used, since the rate of solid cooling can then be regulated by the temperature and rate of introduction of the inert cooling gas. If, however, a low temperature combustion supporting gas is used for the cooling as well as for the combustion then the cooling stages should preferably be of volume substantially equal to that required. It will be apparent that the required cooling stage volume as determined by a predetermined amount of solid to gas heat transfer is dependent also on most of the variables mentioned above inherent in any given application and further upon the solid to gas heat transfer coefficient for the particular catalyst and gas concerned at the chosen operating conditions. Such heat transfer data may best be obtained experimentally for the particular gas and catalyst system involved. It has generally been found convenient to employ cooling gas at inlet temperatures of the order of atmospheric temperature.

In all the modifications of the invention it is important that the rate of gas flow be limited below that which will cause disruption of the substantially compact column of catalyst within the regenerator. Such disruption may be described as a boiling of the catalyst particles by excessive rates of gas flow therethrough.

Since the rate of gas flow per unit of pressure drop will decrease with decrease in the average particle size of the contact material and since the pressure drop required to boil contact material will increase with increase in contact material apparent unpacked density, it will become apparent that the maximum allowable rate of gas flow will increase rapidly with increase in the average particle size and in the apparent unpacked density of the contact material. What this limit may be can best be determined by determination of the contact material apparent unpacked density (density of the contact material as poured into a container and not packed in pounds per cubic foot of container volume occupied) and experimental determination of the pressure drops caused by the flow of measured quantities of gas through a unit column of contact material at the conditions of the operation in question. Such determinations may easily be made by anyone experienced in the art. The gas flow rates may be kept below the limiting maximum set forth hereinabove either by proper control of the stage cross-sectional area to volume ratio or by use of a plurality of gas distributors and collectors within the stages. It has been found generally preferable to limit the rate of gas flow by such design to approximately 0.7 to 0.9 of that velocity required to boil the catalyst. It will be understood that less economical operation may be obtained outside these limits and below the maximum rate which will boil the catalyst.

The number of stages required for any given application is of course dependent upon the amount of contaminant which may be removed in any given stage as controlled by the method of this invention and upon the total amount of contaminant to be removed. The linear rate of catalyst flow is to a large extent dependent upon the stage cross-sectional area to volume ratio as determined by gas rate requirements.

Exemplary of the application of this invention is the burning of carbonaceous deposit from a particle form clay type catalyst which has been previously used as a hydrocarbon conversion catalyst. The catalyst particle size may vary from 3 to 60 mesh size and the density may vary from 30 to 60 pounds per cubic foot. The carbonaceous deposit which must be removed may vary from 0.4 to 6.0% by weight of the catalyst. The minimum temperature required for rapid burning of the contaminant with air is of the order of 700° F. to 1100° F. depending upon the stage of its removal and the catalyst may be heat damaged substantially above 1100 to 1400° F. varying from one type of catalyst to another.

It has been found that the amount of contaminant removed per stage required to change the catalyst temperature between predetermined set limits within the minimum required for rapid combustion and the maximum above which the catalyst would be heat damaged may vary from about 0.1 to 3.0% by weight of catalyst, depending upon the stage of the regeneration. The number of burning stages required may vary between three and twenty depending upon the total amount of contaminant to be removed.

The maximum rate of gas flow as limited by catalyst boiling was found to be in the order of 70 cubic feet of air per minute per square foot of free stage cross-section at 950° F. and approximately atmospheric pressure, (air volume measured at standard conditions) for a clay type catalyst having an average particle diameter of 3 mm. and a density of about forty pounds per cubic foot.

The specific illustration of apparatus and of processes to which this invention is applicable are intended to be merely exemplary in character, and it is not intended that this invention should be limited thereto except as limited in the following claims. It should be particularly observed that the method and application of this invention are applicable to either endothermic or exothermic gaseous reactions either in the presence of or with moving particle form solid material.

I claim:

1. In a process of the type described, a method for burning contaminant deposits from a particle form inorganic solid contact material by the action of a combustion supporting gas at controlled elevated temperatures comprising: passing said solid through a series of superposed alternate combustion and cooling zones wherein it flows as a substantially compact column of downwardly flowing particle form solid material, continuously supplying contaminant bearing solid to the uppermost zone at a temperature sufficient to initiate the contaminant combustion, continuously withdrawing said solid from the lowermost zone at a controlled rate, introducing combustion supporting gas to each of said combustion zones at an independently controlled rate, distributing said gas at a plurality of locations within each of said combustion zones and collecting gas to a second plurality of locations within each of said combustion zones, said distributing and collecting locations being so spaced apart as to permit the total required gas flow through the moving solid within each of said combustion zones without boiling of said solid, withdrawing gas from each of said combustion zones while substantially preventing flow of said gas into adjacent cooling zones, independently introducing a substantially inert cooling gas into each of said cooling zones at a controlled rate and temperature, similarly distributing and collecting said gas within each of said cooling zones and withdrawing it therefrom; controlling the rate of combustion supporting gas introduction to each combustion zone to effect therein an amount of contaminant combustion sufficient to heat said solid from an inlet temperature which is near but above that minimum required for rapid contaminant combustion to an outlet temperature which is near but below that which would cause heat damage to the solid material, and controlling the rate and temperature of inert cooling gas introduction to said cooling zones to effect removal from the solid material of substantially all the heat absorbed by it in the preceding combustion zone without the aid of indirect heat transfer between the solid material and any cooling fluid.

2. In a process of the type described, a method for burning contaminant deposits from a particle form solid inorganic, contact material by the action of a combustion supporting gas at controlled elevated temperatures comprising: passing said solid through a series of superposed alternate combustion and cooling zones wherein it flows as a substantially compact column of downwardly flowing particle form solid material, continuously supplying contaminant bearing solid to the uppermost zone at a temperature sufficient to initiate the contaminant combustion, continuously withdrawing said solid from the lowermost zone at a controlled rate, introducing combustion supporting gas to each of said combustion zones at an independently controlled rate, passing said combustion supporting gas through said solid within said combustion zones and withdrawing gas therefrom while substantially preventing gas flow between adjacent combustion and cooling zones, independently introducing a substantially inert cooling gas to each of said cooling zones at a controlled rate and temperature, passing said cooling gas through the solid within each cooling zone and withdrawing the heated gas from each cooling zone while substantially preventing its flow into adjacent combustion zones, passing said effluent gas through an external cooling and moisture removing system and then re-using as cooling gas for said cooling zones; controlling the rate of said gas flow through each combustion zone within about 0.7 to 0.9 of that which will boil the contact material and sufficiently high to insure an excess of oxygen in the gas leaving said zone, maintaining the residence time of the contact material in each combustion zone suitable to accomplish heating of the contact material by the heat of contaminant burning from an inlet temperature near but above that minimum required for rapid contaminant combustion to an outlet temperature near but below that maximum at which the contact material will suffer heat damage, and controlling the rate of flow of said cooling gas to each cooling zone to effect cooling of the contact material from its outlet temperature from the preceding combustion zone to a level near but above that minimum temperature required for rapid contaminant combustion.

3. Apparatus for burning contaminant deposits from particle form solid contact mass material at controlled elevated temperatures by the action of a combustion supporting gas comprising: an upwardly extending elongated shell closed on either end, means to admit said solid to the upper end thereof, means to withdraw said solid from the lower end thereof, flow control means associated with said withdrawal means to permit maintenance of a substantially compact column of solid in said shell, a plurality of vertically spaced apart superposed sets of gas handling members within said shell each set comprising two vertically spaced rows of gas collecting troughs and a row of gas distributing troughs positioned vertically substantially midway therebetween, an external reactant inlet header, means to supply reactant fluid to said header, conduit manifolding communicating said header with the rows of gas inlet troughs in the alternate sets beginning with the uppermost set, an outlet reactant header, conduit manifolding communicating said outlet header with the rows of collecting troughs in said alternate sets beginning with the uppermost, a separate external cooling gas inlet header, conduit manifolding communicating said last named header with the rows of distributing troughs in the remaining sets, a separate external cooling gas outlet header and conduit manifolding communicating said header with the collecting troughs in said remaining sets.

4. An apparatus for conducting thermochemical reactions involving a fluid reactant and a moving particle form solid material comprising in combination: an upwardly extending elongated shell, means to supply solid into the upper section thereof, means to withdraw solid material from the lower section thereof, flow control means associated with said withdrawal means to permit maintenance of a substantially compact column of solid in said shell, a plurality of vertically spaced apart superposed sets of gas handling members within said shell each set comprising two vertically spaced rows of gas collecting troughs and a row of gas distributing troughs positioned vertically substantially midway therebetween, the vertical distance between rows of gas distributing troughs and rows of gas collecting troughs being greater in alternate sets beginning with the uppermost set than in the remaining alternate sets, an external reactant inlet header, means to supply reactant fluid to said header, conduit manifolding communicating said header with the rows of reactant inlet troughs in the alternate sets beginning with the uppermost set, flow throttling devices on said manifolding arranged for separate control of the reactant flow to each row of reactant inlet troughs, an outlet header, conduit manifolding communicating said outlet header with the rows of collecting troughs in said alternate sets beginning with the uppermost, a separate external heat exchange gas inlet header, conduit manifolding communicating said last named header with the rows of distributing troughs in the remaining sets, flow throttling devices on said last named manifolding arranged for separate control of the heat exchange gas flow to each heat exchange stage, a separate external heat exchange gas outlet header and conduit manifolding communicating said header with the collecting troughs in said remaining sets.

5. A process for regeneration of particle form solid, inorganic contact material which has become spent by deposition of a carbonaceous contaminant deposit thereon which comprises: passing said contact material downwardly through a series of alternating regeneration and cooling zones in which it flows as a substantially compact column, supplying spent contact material to the uppermost zone at a temperature suitable for initiating combustion of said contaminant, withdrawing regenerated contact material from the lowermost zone, passing a combustion supporting gas through each regeneration zone at an independently controlled rate to effect combustion of said contaminant, controlling the rate of said gas flow through each regeneration zone to effect an amount of contaminant combustion sufficient to heat said contact material from its inlet temperature to said zone to a set safe miximum outlet temperature which is near but below the contact material heat damaging temperature, passing a gaseous cooling agent through the column of contact material in each cooling zone at an independently controlled rate to effect cooling of the contact material by direct heat transfer with said gaseous cooling agent, controlling the rate of flow of said gaseous cooling agent to each cooling zone to effect the cooling of the contact material from its outlet temperature from the preceding regeneration zone to a level near but above that minimum temperature required for rapid contaminant combustion and excluding substantial flow of gas between adjacent regeneration and cooling zones.

6. A method for burning carbonaceous contaminant deposits from a particle form inorganic, solid contact material which comprises: maintaining a substantially compact upright column of downwardly flowing particle form contact material, replenishing said column with contaminant bearing contact material at its upper end, withdrawing regenerated contact material from the lower section of said column, introducing streams of a combustion supporting gas into said column at a plurality of vertically spaced apart levels along its length at independently controlled rates to effect the burning of said contaminant, introducing streams of gaseous cooling agent at independently controlled rates into said column at a second plurality of vertically spaced levels spaced from and lying intermediate said levels of combustion supporting gas introduction, dividing each of said combustion supporting gas streams into two secondary streams one of which flows upwardly through a portion of said column length and the other of which flows downwardly through a portion of the column length, dividing each of said cooling agent streams into two secondary streams, flowing one of said secondary streams upwardly through a portion of said column length until it joins the downflowing secondary stream from the combustion supporting gas introduction level next above at a level intermediate the levels of combustion supporting gas and cooling agent introduction and withdrawing the joined gas streams from said column at said intermediate level of joinder, flowing the other of said secondary streams of gaseous cooling agent from each level of gaseous cooling agent introduction downwardly through a portion of the column length until it joins the upwardly flowing secondary stream from the combustion supporting gas introduction level next below at a level intermediate the levels of combustion supporting gas and gaseous cooling agent introduction and withdrawing said last named joined streams from said column at the level of joinder, whereby the column of contact material is caused to flow downwardly through a series of alternate burning and cooling zones, gas being supplied to each zone at an intermediate level and being withdrawn at the two opposite ends of the zone without substantial flow into an adjacent zone, controlling the rate of said combustion supporting gas introduction to each burning zone to effect an amount of contaminant combustion sufficient to heat said contact material from its inlet temperature which is near but above that minimum required for a rapid rate of contaminant combustion to a set safe maximum outlet temperature which is near but below the contact material heat damaging temperature, controlling the rate and temperature of introduction of said gaseous cooling agent to each cooling zone to effect the cooling of the contact material from its outlet temperature from the preceding burning zone to a level near but above that minimum required for rapid contaminant combustion.

7. A process for regeneration of particle form solid inorganic contact material which has become spent by deposition of a carbonaceous contaminant deposit thereon which comprises: maintaining a laterally confined, vertical, substantially compact continuous column of downwardly flowing particle form solid contact material; continuously replenishing said column at its upper end with spent contaminant bearing contact material at a temperature sufficiently high to initiate the contaminant combustion; withdrawing regenerated contact material from the lower end of said column; introducing an oxygen containing gas into said column at a plurality of spaced apart levels along its length at a rate independently controlled for each level; splitting the gas flow in the column at each level of introduction and passing part of the gas upwardly through a portion of the column length from each level of introduction and the remainder of the gas downwardly through a portion of the column length to effect the contaminant combustion; withdrawing the gas introduced at each level from said column at a separate outlet level spaced above and a separate outlet level spaced below the level of its introduction; whereby a series of vertically spaced apart burning zones are provided along said column in each of which the gas flows in part upwardly and in part downwardly from an intermediate inlet level to independent outlet levels at both the upper and lower ends of each burning zone; introducing an inert cooling gas into said column at an independently controlled rate at another plurality of levels lying between said burning zones; similarly flowing the cooling gas in part upwardly and in part downwardly from said last named levels to independent outlet levels spaced thereabove and therebelow and lying between said burning zones; whereby a cooling zone is provided between adjacent burning zones, the gas flowing in each cooling zone from an intermediate inlet level to separate outlet levels spaced thereabove and therebelow, the levels of gas withdrawal from adjacent cooling and burning zones being vertically spaced apart so as to prevent substantial flow of gas therebetween; controlling the rate of introduction of oxygen containing gas to each burning zone in excess of that required to accomplish the contaminant combustion occurring therein but below that which will cause substantial boiling of the contact material and maintaining the contact material residence time therein suitable for accomplishing heating of the contact material by the heat released by the contaminant combustion from a set minimum near but above that required for rapid contaminant combustion rates to a set outlet near but below that which will cause heat damage to the contact material, and controlling the rate and temperature of the gas flow to each cooling zone and maintaining the contact material residence time therein suitable for accomplishing removal from the contact material of substantially all the heat absorbed by the contact material in the preceding burning zone.

8. A method for regeneration of particle form inorganic contact materials bearing a carbonaceous contaminant deposit which comprises: passing the contact material downwardly through a series of alternating burning and cooling zones through which it flows as a substantially compact gravitating stream, separately introducing an oxygen containing gas into each burning zone and passing it through the column therein in a direction parallel to the contact material flow to effect burning of said contaminant, controlling the rate of said gas introduction to each zone sufficiently high to accomplish burning therein near the maximum possible rate at the temperature and pressure conditions involved and to insure an excess of oxygen in the effluent gas from said zone but maintaining the rate below that which would substantially boil the solid particles, withdrawing gaseous combustion products containing excess oxygen from each burning zone while excluding its flow into adjacent cooling zones, retaining said contact material in each burning zone for a time suitable to effect its heating by the burning reaction from an inlet temperature near the minimum required for a rapid burning rate to an outlet temperature near the maximum at which the contact material would suffer heat damage, separately introducing an inert cooling gas into each cooling zone at an independently controlled rate and passing said gas through the column therein in a direction parallel to the contact material flow to remove heat from the contact material by direct heat transfer, withdrawing the cooling gas from said cooling zones while preventing substantial flow thereof into adjacent burning zones, controlling the rate and temperature of inert gas introduction to each cooling zone to effect removal therefrom as increased sensible heat in the effluent gas of substantially all the heat released in the previous burning zone without the aid of indirect heat transfer between the contact material and any cooling fluid.

JOHN A. CROWLEY, Jr.

REFERENCES CITED

The following references are of record in the file of this patent:

UNITED STATES PATENTS

| Number | Name | Date |
|---|---|---|
| 1,155,402 | Bornmann | Oct. 5, 1915 |
| 1,286,438 | Morris | Dec. 17, 1918 |
| 1,949,427 | McComb | Mar. 6, 1934 |
| 2,320,562 | Bransky | June 1, 1943 |
| 2,330,710 | Hemminger | Sept. 28, 1943 |
| 2,344,449 | Ogorzaly | Mar. 14, 1944 |
| 2,409,596 | Simpson et al. | Oct. 15, 1946 |
| 2,410,309 | Simpson et al. | Oct. 29, 1946 |
| 2,418,673 | Sinclair et al. | Apr. 8, 1947 |

FOREIGN PATENTS

| Number | Country | Date |
|---|---|---|
| 564,870 | Germany | Nov. 24, 1932 |

Certificate of Correction

Patent No. 2,458,487. January 4, 1949.

JOHN A. CROWLEY, Jr.

It is hereby certified that errors appear in the printed specification of the above numbered patent requiring correction as follows:

Column 4, line 71, for the word "conduct" read *contact*; column 13, line 38, claim 5, for "miximum" read *maximum*;

and that the said Letters Patent should be read with these corrections therein that the same may conform to the record of the case in the Patent Office.

Signed and sealed this 7th day of June, A. D. 1949.

[SEAL]

THOMAS F. MURPHY,
*Assistant Commissioner of Patents.*